3,048,612
TRANSALKYLATION OF ALUMINUM ALKYLS
Robert A. Walde, Pittsburgh, Pa., assignor to Goodrich-Gulf Chemicals, Inc., Cleveland, Ohio, a corporation of Delaware
No Drawing. Filed May 22, 1958, Ser. No. 736,952
18 Claims. (Cl. 260—448)

This invention relates to organo-metallo compounds and more particularly to an improved process for transalkylating organo-metallo compounds.

Organo-metallo compounds can be reacted with an olefin to form a resultant compound comprised of the metal portion of the organo-metallo compound and said olefin. The resultant compound can be employed as catalyst, hydrolyzed to obtain hydrocarbons, oxidized and subsequently hydrolyzed to obtain alcohols, chlorinated to obtain primary alkyl chlorides, etc. Unfortunately the reaction requires an extended period of time and consequently there is a tendency to form objectionable amounts of dimers of said olefin. In addition, certain olefins, such as internal and cyclic olefins, will essentially not react or will react only slightly with the organo-metallo compound using conventional operating conditions.

I have found that the above difficulties can be avoided and olefins of all types, including the olefins referred to above, can be reacted with the organo-metallo compound in a relatively short reaction period without undue formation of olefin polymer or the like by a process which comprises reacting said olefin with said organo-metallo compound while the latter is present in the form of an organo-metallo amine complex.

The organo-metallo amine complexes which can be employed in the reaction with the olefin can be represented by the following structural formula:

$$R_3N:MeR_x'$$

wherein R is an alkyl, aryl, alkaryl, aralkyl, cycloalkyl, alkenyl, aralkenyl, cycloalkenyl, and heterocyclic, straight or branch chained, or a substituted hydrocarbon radical having from one to 15 carbon atoms, preferably one to two carbon atoms, such as methyl and ethyl; R' is hydrogen, halogen or a hydrocarbon radical having from 2 to 28 carbon atoms, such as alkyl, aryl, alkaryl, aralkyl, cycloalkyl, alkenyl, aralkenyl or cycloalkenyl, straight or branch chained, or a substituted hydrocarbon radical. At least one hydrocarbon radical as described must be attached to each metal atom in the above formula. Me is a metal such as aluminum, boron, gallium, indium, and thallium, and $x$ is the valence of Me. Examples of such organo-metallo compounds are trimethylamine-triethylaluminum, tripentylamine - trioctylaluminum, triethylamine - triisobutylboron, trimethylamine-diisobutylaluminum hydride, triethylamine-diisobutylaluminum hydride, triethylamine-diisobutylaluminum chloride, trioctylamine-dicyclopentylboron chloride, etc. Preferred among the compounds for use in the process of this invention are the alkylamine aluminum alkyls.

Any olefin, including internal and cyclic olefins, can be employed in the reaction with the organo-metallo amine complex. Alpha, gamma olefins, for example, can be used and can be made to react in the gamma as well as the alpha position. The olefins employed can have 2 to 30 carbon atoms, preferably 2 to 20 carbon atoms, in the molecule. Examples of olefins which can be used in the present process include ethylene, octene-1, octene-2, cyclohexene, butadiene, 1-pentadecene, 1-cyclopentyl-2-butene, etc.

The organo-metallo amine complexes can easily be prepared. In the event the amine is gaseous, it can be bubbled through the organo-metallo compound; if liquid, it can be poured into the latter. Preferably approximately stoichiometric amounts of each of the reactants are used. While elevated pressures can be employed, atmospheric pressure is preferred. A temperature of about 20° to about 50° C., preferably about 30° to about 50° C. is satisfactory. The time required for the absorption of the amine by the organo-metallo compound can be about one to about 30 minutes.

By employing an organo-metallo amine complex in the transalkylation reaction, I am able to cut down on the amount of polymer formed and effect a reduction in the reaction time. Moreover, olefins, such as internal and cyclic olefins, which in some cases will not react, or will react only slightly, can thus also be employed. This is due, in large measure, to the fact that the use of an organo-metallo-amine complex permits the use of higher temperatures in the transalkylation reaction than could otherwise be used with organo-metallo compounds at atmospheric pressures. The temperatures which are used in my process during transalkylation can be about 150° to about 220° C., preferably about 170° to about 200° C. Such high temperatures under conventional operating conditions ordinarily result in a breakdown in the organo-metallo compound. The amine complexes used herein, however, are more temperature stable and permit the use of higher temperatures of reaction which results in higher yields. In addition, thermal stability of the metal-carbon bond is increased, and therefore the amount of hydride in the resultant alkyl is reduced, and the stability of metal to secondary carbon atom bonds, e.g., in the tricyclohexyl aluminum or an alkyl made from an internal olefin such as octene-2, is increased. Thus, in the case of alpha olefins, transalkylation at atmospheric pressure can require a total of about 10 hours; in the present case the reaction will require but about one to about 1.5 hours. While the total reaction time in the case of internal olefins and cyclic olefins will be greater, from about 2 to about 5.5 hours, this is far less than other transalkylation reactions wherein such olefins will not react, or if they do react, react only slightly. While the present process can be carried out at elevated pressures if desired, substantially atmospheric pressure is both adequate and preferred.

When the feed olefin is introduced into the system, theoretically it should be introduced therein at a rate substantially equal to the rate at which the olefin is removed from the organo-metallo amine complex in order to have no excess feed olefin available for polymerization reactions. Accordingly, the feed olefin can be introduced into the system at a rate of about 2 to about 5 mols of olefin per mole of organo-metallo amine complex per hour. The rate at which the evolved olefin is removed from the closed system is of course dependent upon the transalkylation rate at the temperature and pressure employed. In general, the transalkylation rate under the reaction conditions defined herein is about 1.6 to about 4.0 cubic feet of olefin per hour per mol of metal.

The transalkylated product obtained is still combined with the amine and thus remains a complex compound. After the evolved olefin has been separated therefrom, which can be effected in any conventional manner, for example, distillation, the transalkylated product can be used as a chemical intermediate in the preparation of alcohols, alkyl halides, oximes, etc.

When used to prepare alcohols, the transalkylated product is first subjected to oxidation in air or oxygen at a temperature of about 0° to about 200° C. and a pressure of about atmospheric to about 500 pounds per square inch for a period of about 10 minutes to about 2 hours. Because the transalkylated product is still present as an amine complex and thus thermally stable, higher temperatures can be employed and thus a reduction in reaction time can occur. Upon oxidation the amine breaks off the transalkylated product. If it is in vapor form, as in the case of trimethylamine and triethylamine, it is permitted to escape or can be recycled to prepare additional organo-metallo amine complex with which the reaction began. If not in vapor form, the amine can be separated from the oxidized product by reducing the pressure thereon and theerafter distilling. The oxidized product remaining can be identified by the following structural formula:

$$Me(OR'')_x$$

wherein Me and $x$ are as defined hereinabove and $R''$ is the olefin introduced into the system during the transalkylation reaction.

The oxidized product can then preferably be hydrolyzed with a hydrolysis medium such as water-hydrochloric acid, water-sulfuric acid, water-acetic acid, etc., at a temperature of about 0° to about 40° C. and a pressure of about 200 millimeters of mercury to about 500 pounds per square inch to obtain an alcohol corresponding to the olefin employed in the transalkylation reaction and a metal hydroxide. The two can be separated in any convenient manner, e.g., by decantation. If desired, the transalkylated product can be chlorinated, preferably with chlorine at a temperature of about 0° to about 40° C. and a pressure of about 200 millimeters of mercury to about 500 pounds per square inch to obtain primary alkyl chlorides.

The invention can further be illustrated with reference to the following examples.

*Example I*

To 63 grams (0.318 mol) of triisobutyl aluminum was added 18.75 grams (0.318 mol) of gaseous trimethyl amine over a period of 15 minutes at a temperature of 45° C. and a pressure of 760 mm. of mercury. The resultant alkyl amine complex (81.75 grams, 0.318 mol) was then heated to 170° C. and 107 grams (0.955 mol) of octene-1 were added slowly over a one-hour period, during which time the temperature remained between 170° and 200° C. and the pressure was atmospheric. 0.748 cubic foot of isobutylene was evolved for a yield by gas evolution of 99 percent. 135 grams (0.318 mol) of the transalkylated amine complex was transferred to a flask together with 29.0 grams of cetane, to act as a thinner, and pure oxygen was bubbled through the mixture at the rate of 4 grams per minute and at a temperature between 85° and 100° C. The mixture was stirred at 1000 to 2000 revolutions per minute, and the reaction was completed, as noted by a sudden drop in temperature and adsorption of oxygen, in 39 minutes. Trimethylamine was evolved during the oxidation and removed from the reaction zone. 124.6 grams (0.318 mol) of the oxidized product was hydrolyzed by reaction with aqueous hydrochloric acid at atmospheric pressure and a temperature of 60° C. 105 grams (0.810 mol) of octyl alcohol, amounting to a yield of 85 percent based on the number of alkyl groups on the original amine complex employed, and 3.7 grams of polymer were found.

*Example II*

The run of Example 1 was repeated except that 0.340 mol of triisobutyl aluminum was employed in the transalkylation reaction in place of the triisobutyl aluminum amine complex. 1.200 mols of octene-1 were used in the transalkylation reaction, and at a temperature of 95° to 130° C. and atmospheric pressure a total of ten hours were needed to obtain a 98 percent yield of transalkylated product. 0.340 mol of the latter product, without dilution, was oxidized over a period of 4 hours and 45 minutes at a temperature of 10° to 65° C. and atmospheric pressure at a stirring rate of 500 revolutions per minute before the reaction was complete. The rate of oxygen addition was 0.0237 gram per minute for a total of 6.76 grams of oxygen. The oxidized product, 139 grams, was hydrolyzed with aqueous hydrochloric acid at a temperature of 60° C. and atmospheric pressure. The yield of octyl alcohol was 73.0 percent. 8.9 grams of polymer was found.

A comparison of Example I with Example II shows the advantages of operating in accordance with my process. In Example I wherein a triisobutyl aluminum amine complex was used, the transalkylation reaction required but one hour and higher temperatures than normally believed feasible were employed. The oxidation required only 39 minutes, and the yield of octyl alcohol was 85 percent, with only 3.9 percent polymer. In Example II, which was not run in accordance with the procedure of my invention, a relaatively low temperature had to be used during transalkylation and the reaction required 10 hours. Similarly, the oxidation period was longer, 4 hours and 45 minutes against 39 minutes. Less alcohol was produced, 73 percent against 85 percent, and the amount of polymer produced was more.

It will be noted from Example I that a tertiary amine was employed in the organic-metallo amine complex. This is so because primary and secondary amines are not satisfactory in the practice of the invention. Thus secondary amines will form a complex with the organo-metallo compound in a manner similar to that formed with the tertiary amine, and as long as it is maintained at room temperature the resulting complex is stable. Upon heating, however, a dialkyl-metal-dialkylamine and a paraffin are formed. Therefore, by using a secondary amine in place of a tertiary amine, one of the alkyl groups is removed, and the total yield of alcohol is reduced, since the number of groups which could be transalkylated with the olefin corresponding to the desired alcohol are less. In the event it should become necessary to purify the alcohol obtained in the process, the same can be effected in various ways, for example, by passing the alcohol over an ion-exchange resin such as Amberlite IR–100, IRC–50 and IR–120 resins of The Resinous Products and Chemical Company and C–200 and C–212 of American Cyanamid Company.

That the organo-metallo complex can be varied and beneficial results will still be obtained is apparent from Example III.

*Example III*

To 76.3 grams (0.385 mol) of triisobutyl aluminum there was added at room temperature with cooling 38.5 grams (0.385 mol) of triethylamine to obtain 114.8 grams (0.385 mol) of addition product. The latter was preheated to 180° C. and 1.15 mols of octene-1 was added over a one-hour period while maintaining such temperature. The triethylamine trioctylaluminum (0.385 mol) was then oxidized with oxygen at 100° C., using 52.0 grams of n-cetane as solvent, in 20 minutes. 0.420 cubic foot of oxygen was adsorbed, giving a 92 percent conversion. 0.385 mol of the oxidized product was hydrolyzed with aqueous hydroxychloric acid at a temperature of 50° C. and atmospheric pressure. The yield of octyl alcohol (octanol-1) was 81.0 percent and polymer 3.0 percent.

While the yield of octanol-1 in Example III was slightly less than in Example I, it was, nevertheless, in excess of that obtained in Example II. The amount of polymer formed, 3.0 percent, was less than had been obtained in Example I. Thus comparable results will be obtained in the practice of my invention regardless of the tertiary amine which is present in the organo-metallo amine complex employed in the transalkylation reaction.

It is known that extremely low yields will be obtained in accordance with processes of the type described herein wherein the olefin employed to produce the desired alcohol is an internal olefin. However, in the practice of my invention, internal olefins can be employed and relatively high yields of alcohols will be obtained. This is shown below in Example IV.

Example IV 112.0 grams (0.436 mol) of trimethylamine triisobutyl aluminum was preheated to 180° C. and 146.1 grams (1.310 mols) of octene-2 was added slowly thereto over a period of 5½ hours. The temperature during transalkylation was maintained at 180° to 190° C. and the pressure was atmospheric. During this time 73.0 grams of isobutylene was evolved to give a 100 percent conversion by gas evolution. 185 grams of the resulting alkyl was oxidized with 9.46 grams of pure oxygen, using 40 cc. of n-cetane as a thinner, and a temperature of 95° to 120° C. and atmospheric pressure. A 90 percent conversion of alkyl to alkoxide was obtained with complete evolution of trimethylamine. 150 grams of the alkoxide was hydrolyzed with aqueous hydrochloric acid at a temperature of 60° C. and a pressure of 15 pounds per square inch over a period of 30 minutes. 31.0 grams of octanol-1, 30.0 grams of octanol-2 and 30 grams of octanol-3 were obtained, which amounts to a yield of 53.5 percent based on the alkyl charge. No polymer was detected.

Example V below shows the process of my invention using a cycloolefin in the transalkylation reaction.

Example V

To 98.5 grams (0.497 mol) of triisobutyl aluminum was added 28.5 grams (0.500 mol) of gaseous trimethylamine over a period of 20 minutes at a temperature of 50° C. and atmospheric pressure. The resultant aluminum alkyl amine (127.0 grams, 0.497 mol) was then heated to 185° C. and 121.5 grams (1.48 mols) of cyclohexene were added slowly over a 5½ hour period during which time the temperature remained between 170° and 195° C. and the pressure was atmospheric. 1.125 cubic feet of isobutylene was evolved at standard temperature and pressure for a yield by gas evolution of 95.5 percent. The resulting transalkylated product (160 grams, 0.497 mol) was oxidized with 9.55 grams of pure oxygen, using 50 cc. of n-centane and 50 cc. of xylene as solvent, at 95° to 105° C. and atmospheric pressure for 35 minutes. 0.470 cubic foot or oxygen were adsorbed for a measured conversion of 80 percent. During the oxidation trimethylene was evolved. 0.497 mol of the alkoxide were hydrolyzed with aqueous hydrochloric acid at a temperature of 50° C. and atmospheric pressure over a period of 15 minutes. Based on the alkyl charge, the yield of cyclohexanol obtained was 57.8 percent. No polymer was detected.

The above example should be contrasted with a similar process wherein an amine complex was not employed.

Example VI 67 grams of triisobutyl aluminum were heated to 140° C. and 71 grams of cyclohexene were added thereto over a period of one hour while maintaining the temperature at 140° C. to 180° C. During the transalkylation 14 grams of isobutylene were evolved. 124 grams of the transalkylated product were oxidized with pure oxygen over a period of 30 minutes using a temperature of 60° C. and atmospheric pressure. The resulting alkoxide was hydrolyzed with aqueous hydrochloric acid at atmospheric pressure and a temperature of 50° C. 10.9 grams of cyclohexanol, amounting to a yield of 11.7 percent, was obtained. No polymer was detected.

From the above it is apparent that by using the process of this invention the yield of cycloalcohol was increased five fold. This is believed to occur because of the greater stability of the carbon to aluminum bond when using the amine complex in the transalkylation reaction.

Further advantages of my invention are illustrated in the examples below. In Example VII, the olefin employed is a diolefin, butadiene, while in Example VIII, the olefin is ethylene.

Example VII 1,3 butadiene was bubbled through 150.1 grams of trimethylamine triisobutyl aluminum at a temperature of 190° C. and atmospheric pressure over a period of 5.5 hours. As a result thereof, butadiene was adsorbed and isobutylene was evolved. The transalkylated product was analyzed by hydrolysis, which results in the conversion of alkyl groups to paraffin and olefin gases, by adding to 0.85 gram of the product, 2 cc. of isobutyl alcohol, to control the reaction, and 5 cc. of 38 percent aqueous hydrochloric acid at atmospheric pressure and at 100 C. Conversion of isobutyl groups to butadienyl groups was found, by analysis of the evolved gases, to be 61.7 percent complete.

Example VIII

Ethylene was bubbled through 0.400 mol of trimethylamine triisobutylaluminum at a temperature of 170° C. to 200° C. and atmospheric pressure over a period of two hours. Ethylene was thus adsorbed and isobutylene was evolved. The product was analyzed by hydrolysis of a 0.6730 gram sample by adding thereto 2 cc. of isobutyl alcohol, to control the hydrolysis reaction, and then 5 cc. of a 38 percent aqueous solution of hydrochloric acid at atmospheric pressure and 100° C. Conversion of isobutyl groups to ethyl groups was found by analysis of the evolved gases, to be 88 percent complete.

Obviously, many modifications and variations of the invention, as hereinabove set forth, can be made without departing from the spirit and scope thereof, and therefore only such limitations should be imposed as are indicated in the appended claims.

I claim:

1. A transalkylation process which comprises reacting an alkyl aluminum-tertiary amine complex with a hydrocarbon containing only olefinic unsaturation at a temperature of about 150° to about 220° C.

2. A transalkylation process which comprises reacting an alkyl aluminum-tertiary amine complex with an olefin containing only alpha olefinic unsaturation at a temperature of about 150° to about 220° C.

3. A transalkylation process which comprises reacting an alkyl aluminum-tertiary amine complex with an olefin containing only internal olefinic unsaturation at a temperature of about 150° to about 220° C.

4. A transalkylation process which comprises reacting an alkyl aluminum-tertiary amine complex with an olefin containing only diolefinic unsaturation at a temperature of about 150° to about 220° C.

5. A transalkylation process which comprises reacting an alkyl aluminum-tertiary amine complex with an olefin containing only cycloolefinic unsaturation at a temperature of about 150° to about 220° C.

6. A transalkylation process which comprises reacting an alkyl aluminum-tertiary amine complex with octene-1 at a temperature of about 150° to about 220° C.

7. A transalkylation process which comprises reacting an alkyl aluminum-tertiary amine complex with octene-2 at a temperature of about 150° to about 220° C.

8. A transalkylation process which comprises reacting an alkyl aluminum-tertiary amine complex with butadiene at a temperature of about 150° to about 220° C.

9. A transalkylation process which comprises reacting an alkyl aluminum-tertiary amine complex with cyclohexene at a temperature of about 150° to about 220° C.

10. A transalkylation process which comprises reacting trimethylamine-triisobutylaluminum with octene-1 at a temperature of about 150° to about 220° C.

11. A transalkylation process which comprises reacting triethylamine-triisobutylaluminum with octene-1 at a temperature of about 150° to about 220° C.

12. A transalkylation process which comprises reacting trimethylamine-triisobutylaluminum with octene-2 at a temperature of about 150° to about 220° C.

13. A transalkylation process which comprises reacting trimethylamine-triisobutylaluminum with butadiene at a temperature of about 150° to about 220° C.

14. A transalkylation process which comprises reacting trimethylamine-triisobutylaluminum with cyclohexene at a temprature of about 150° to about 220° C.

15. A process for producing an alcohol which comprises reacting an alkyl aluminum-tertiary amine complex with a hydrocarbon containing only olefinic unsaturation at a temperature of about 150° to about 220° C., oxidizing the transalkylated product obtained and hydrolyzing the oxidized product to produce an alcohol corresponding to said olefin.

16. A process for producing an alcohol which comprises reacting a trimethylamine-triisobutylaluminum complex with a hydrocarbon containing only olefinic unsaturation at a temperature of about 150° to about 220° C., oxidizing the transalkylated product obtained and hydrolyzing the oxidized product to produce an alcohol corresponding to said olefin.

17. A process for producing an alcohol which comprises reacting a triethylamine-triisobutylaluminum complex with a hydrocarbon containing only olefinic unsaturation at a temperature of about 150° to about 220° C., oxidizing the transalkylated product obtained and hydrolyzing the oxidized product to produce an alcohol corresponding to said olefin.

18. A process for producing an alcohol which comprises reacting an alkyl aluminum-tertiary amine complex with octene-1 at a temperature of about 150° to about 220° C., oxidizing the transalkylated product obtained and hydrolyzing the oxidized product to produce an alcohol corresponding to said olefin.

References Cited in the file of this patent

UNITED STATES PATENTS

| | | |
|---|---|---|
| 2,394,848 | Doumani | Feb. 12, 1946 |
| 2,744,127 | Ziegler et al. | May 1, 1956 |
| 2,792,431 | Niebling et al. | May 14, 1957 |
| 2,826,598 | Ziegler et al. | Mar. 11, 1958 |
| 2,835,689 | Ziegler et al. | May 20, 1958 |
| 2,863,895 | Kirshenbaum et al. | Dec. 9, 1958 |